June 3, 1930. J. M. CRAWFORD 1,761,972
CLUTCH PRESSURE LEVER PLATE
Filed Dec. 12, 1928
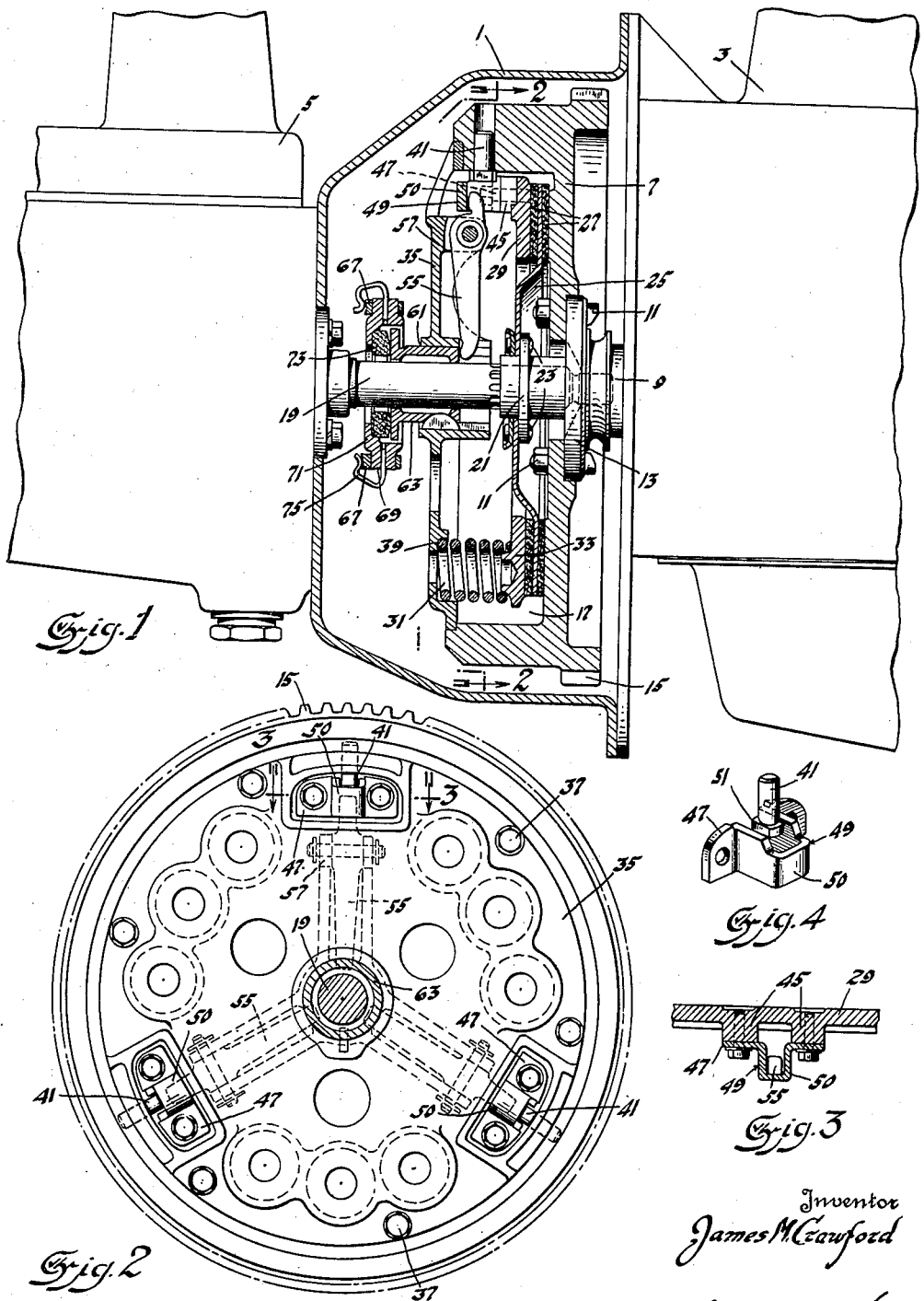
Inventor
James M Crawford
By Blackmore, Spencer & Fluck
Attorneys Patented June 3, 1930

1,761,972

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

CLUTCH PRESSURE LEVER PLATE

Application filed December 12, 1928. Serial No. 325,470.

This invention relates to clutches, and more particularly is designed as an improvement in the clutch to be used between the engine of a motor vehicle and the change speed transmission.

An object of the invention is to improve a friction clutch by simplifying this construction. As a further and more specific object, the invention aims to utilize parts functioning with the release levers to also hold from relative rotation, the driving member or flywheel and the pressure plate. Other objects and advantages will be apparent from the following description.

In the drawing accompanying this description:

Figure 1 is a vertical sectional view through the clutch;

Figure 2 is a transverse section substantially on line 2—2 of Figure 1;

Figure 3 is a section on line 3—3 of Figure 2; and

Figure 4 shows a detail in perspective.

Referring by reference characters to the drawing, numeral 1 represents a clutch housing positioned between the motor represented by numeral 3 and the change speed mechanism represented by numeral 5.

Within the housing 1 is a flywheel 7 carried by crankshaft 9. The flywheel may be secured by fastening means 11 to a crank shaft flange 13 and it may be provided with a gear ring 15 for engagement with a pinion of a starting device, not illustrated.

The flywheel or driving member of the clutch is recessed as at 17. Centrally and axially extending into the recess is the driven shaft of the clutch designated by numeral 19. This shaft may be piloted into the end of the shaft 9, as usual. Shaft 19 carries a flanged member 21, to which is secured by fastening means 23 a dished plate 25, this being the driven plate of the clutch. The driven shaft enters the transmission housing where it may be connected to drive the propeller shaft at the same or reduced speeds in a well-known way, and with which this application is not concerned.

On each side of the outer segmental parts of the driven plate are friction discs 27. Numeral 29 represents the plate generally designated by the term "pressure plate." This plate is, as usual, mounted to rotate at all times with the flywheel and also to slide axially relative to the flywheel to frictionally grip the driven plate between itself and the flywheel and thus effect the drive of the driven plate from the driving shaft.

The means to so hold the pressure plate in active driving relation to the flywheel comprises a set of springs, herein shown as a plurality of coil springs 31 distributed in a generally circumferential series about the pressure plate. As shown in Figure 2, these springs are arranged in groups of three, there being centering cups on the pressure plate entering the several springs as at 33. To provide the fixed abutment for the springs, there is an abutment plate 35 secured to the flywheel periphery by fastening means 37. Cup-shaped depressions 39 are provided on the abutment plate to receive the outer ends of the coil springs 31.

To keep the pressure plate from any rotation relative to the flywheel, there is provided a plurality of pins or studs 41 projecting inwardly from the flywheel flange, there being three of these pins shown. The pressure plate has pairs of lugs 45 and to these lugs are secured the outwardly directed flanges 47 of the U-shaped members 49. The heads 51 of the studs enter between the side walls of the U-shaped members and the rotation of the flywheel is thus transmitted to the pressure plate. The clutch is released by withdrawing the pressure plate axially away from the flywheel against the tension of springs 31. To perform this operation, there are employed levers 55, three in number, pivoted to lugs 57 on the abutment plate. These levers are of the first class and their outer ends enter between the side walls of the U-shaped members 49 and engage the bridge portion 50 thereof. When the lever is swung so that its outer end presses the bridge portion away from the flywheel, it interrupts the friction drive effected by the clutch in the well-known way. It will be observed that the arms of the U-shaped member are tapered on one side in the vicinity of the bridge. As a result, the pressure plate has ample axial movement without danger of the head of lug 41 engaging the bridge. By the means described, the U-shaped members function both as a means for engagement with the levers 55 to release the clutch, and also as the means to engage the lugs 41 to receive the rotary drive from the clutch. The use of one and the same part to co-operate with the flywheel part and with the releasing lever simplifies the construction heretofore used.

The abutment plate has a relatively large central opening, as at 61, which receives a sleeve 63, the inner end of which is shaped to engage the power ends of levers 55. This sleeve may be reciprocated in any preferred manner in clutch releasing action. There may be, for example, a lever with forked ends 67, the ends 67 being the only parts of the lever shown. These ends 67 may engage trunnions 69 projecting from a collar 71. The collar carries suitable anti-friction means 73 which engages the end of sleeve 63. To retain the forked ends 67 of the levers on the trunnions, retaining springs 75 may be employed. As the operating lever is moved, its ends 67 reciprocate the collar and sleeve and through the instrumentality of the levers 55, reciprocate the pressure plate away from the flywheel and release the clutch. It may be stated that no invention is herein claimed for the clutch releasing means involving the sleeve and collar.

I claim:

1. In a clutch, a flywheel, a coaxial driven member, a coaxial pressure plate movable to frictionally engage said driven member between itself and said flywheel, means including co-operating parts on said flywheel and pressure plate whereby the latter is driven by the former, and manually operated means to move said pressure plate axially to release said clutch, said manually operated means engaging the pressure plate part of the said co-operating parts, the flywheel part of said co-operating parts being an inwardly directed stud, and the pressure plate part being a detachable U-shaped member, the stud projecting into the space between the sides of the U-shaped member.

2. In a clutch, a flywheel, a coaxial driven member, a coaxial pressure plate movable to frictionally engage said driven member between itself and said flywheel, means including co-operating parts on said flywheel and pressure plate whereby the latter is driven by the former, and manually operated means to move said pressure plate axially to release said clutch, said manually operated means engaging the pressure plate part of the said co-operating parts, the flywheel part of said co-operating parts being an inwardly directed stud, the pressure plate being a U-shaped member receiving the head of said stud between the arms of the U-shaped member, and the manually operated member being also received between the arms of the U-shaped member and engageable with the bridge of the U-shaped member in the act of clutch release.

3. In a clutch, a flywheel, a coaxial driven member, a coaxial pressure plate movable to frictionally engage said driven member between itself and said flywheel, means including co-operating parts on said flywheel and pressure plate whereby the latter is driven by the former, and manually operated means to move said pressure plate axially to release said clutch, said manually operated means engaging the pressure plate part of the said co-operating parts, the flywheel part of said co-operating parts being an inwardly directed stud, the pressure plate part being a U-shaped member receiving the head of said stud between the arms of the U-shaped member, and a manually operated member being also received between the arms of the U-shaped member and engageable with the bridge thereof, the adjacent ends of the stud and manually operable member being spaced, and the bridge end of the U-shaped member being of less depth whereby the stud may move relative to the U-shaped member without engaging the bridge.

In testimony whereof I affix my signature.

JAMES M. CRAWFORD.